No. 781,310. PATENTED JAN. 31, 1905.
J. R. STEITZ.
POTATO PLANTER.
APPLICATION FILED SEPT. 15, 1903.
3 SHEETS—SHEET 3.
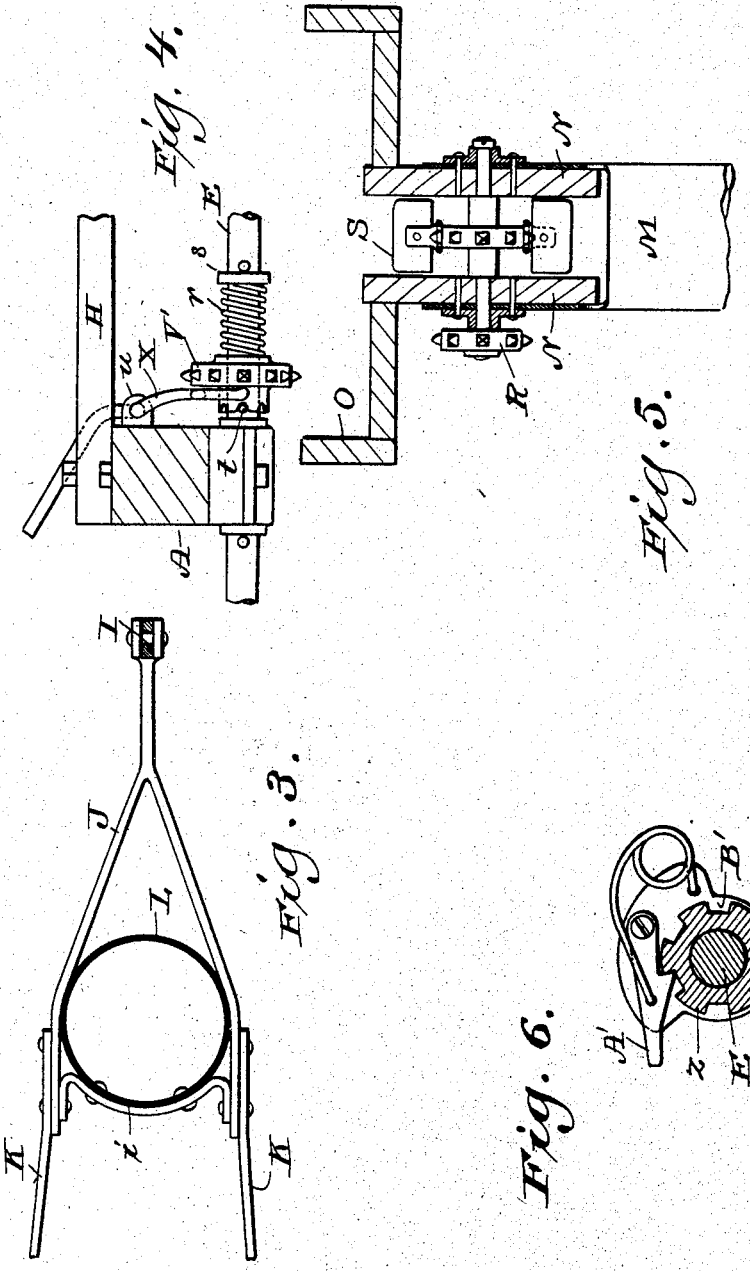

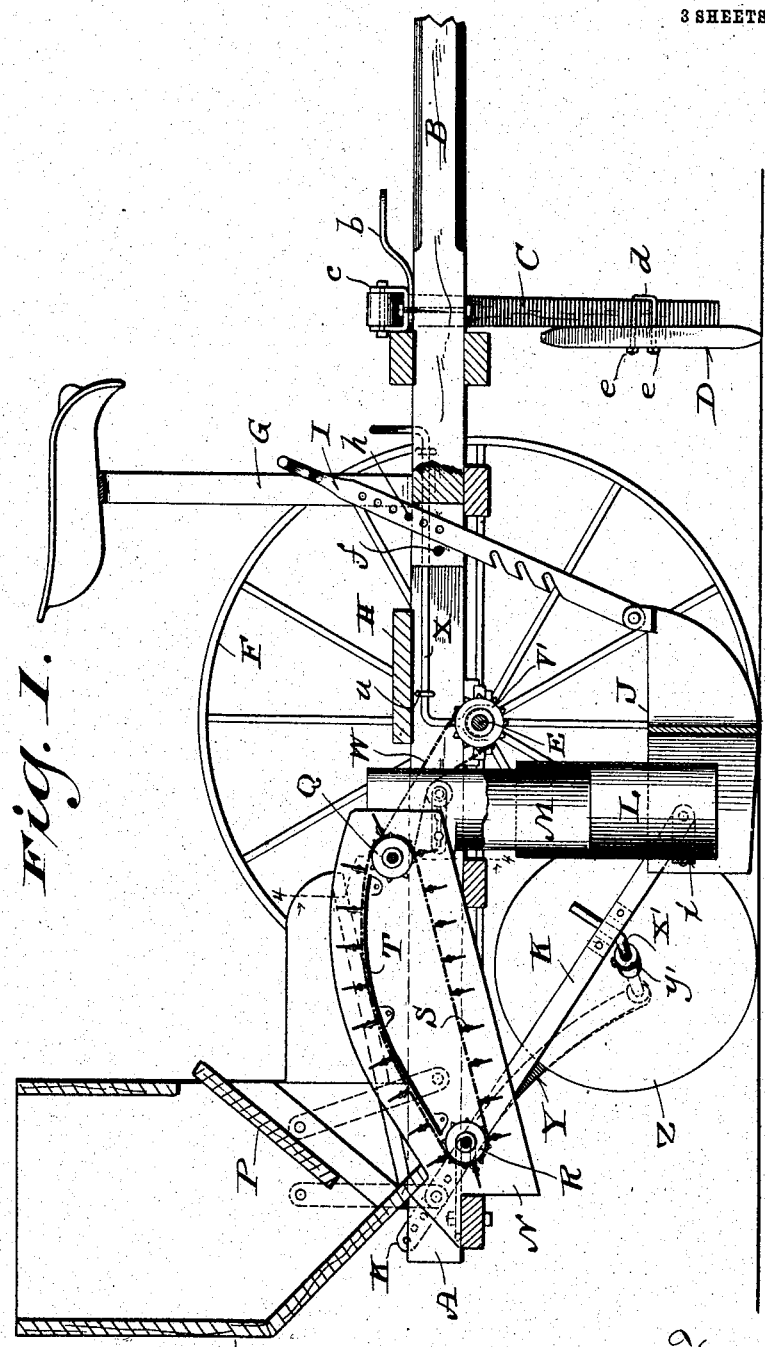

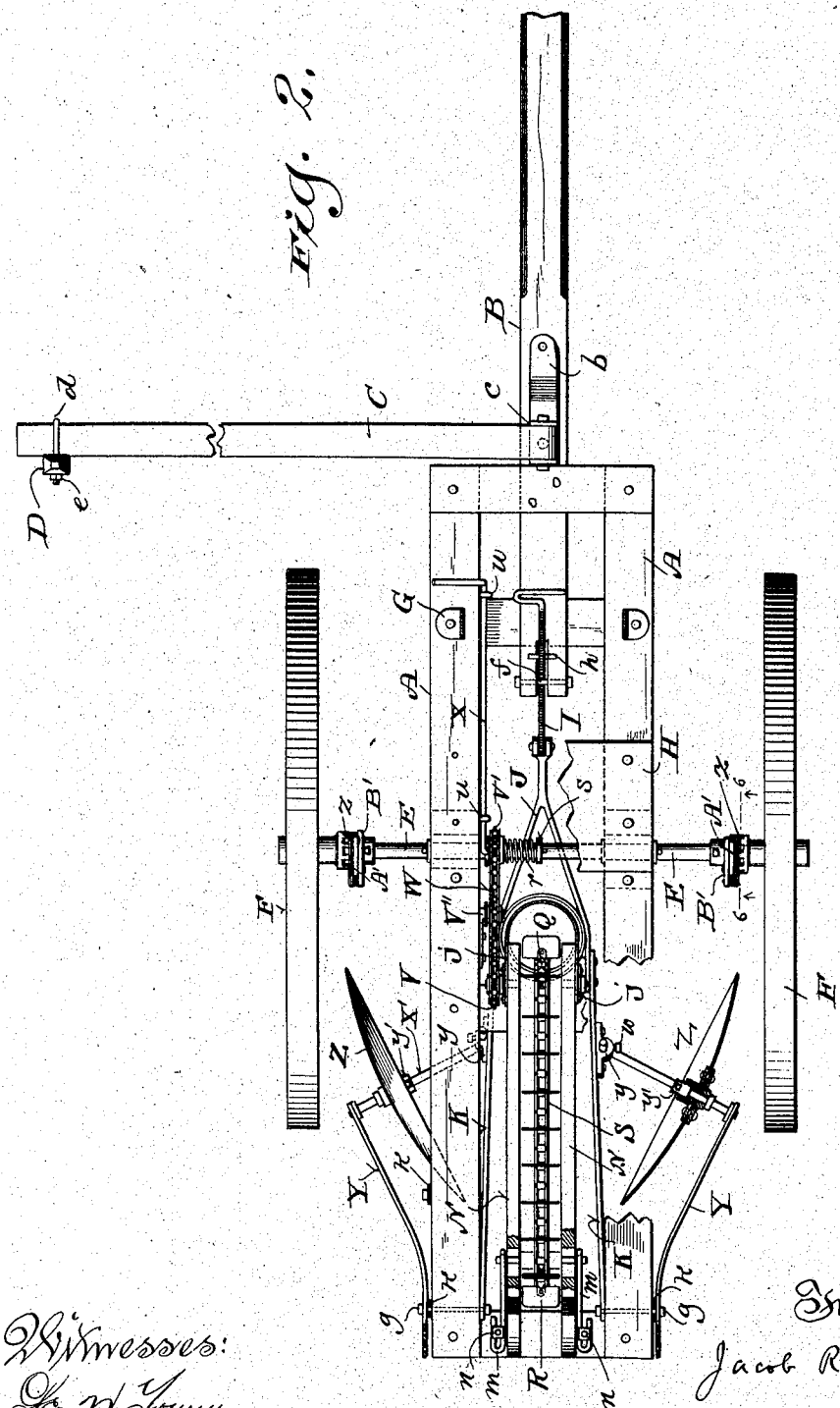

No. 781,310.

Patented January 31, 1905.

UNITED STATES PATENT OFFICE.

JACOB R. STEITZ, OF LAKE, WISCONSIN.

POTATO-PLANTER.

SPECIFICATION forming part of Letters Patent No. 781,310, dated January 31, 1905.

Application filed September 15, 1903. Serial No. 173,232.

*To all whom it may concern:*

Be it known that I, JACOB R. STEITZ, a citizen of the United States, and a resident of town of Lake, in the county of Milwaukee and State of Wisconsin, have invented certain new and useful Improvements in Potato-Planters; and I do hereby declare that the following is a full, clear, and exact description thereof.

My invention consists in certain peculiarities of construction and combination of parts hereinafter particularly set forth with reference to the accompanying drawings and subsequently claimed, the object of the invention being to provide simple, economical, and efficient potato-planters.

Figure 1 of the drawings represents a vertical longitudinal section view of a potato-planter that embodies the features of my invention; Fig. 2, a plan view of the planter having the potato-hopper thereof removed and some of the parts broken away; Fig. 3, a plan view of the furrow-opener of said planter; Fig. 4, a sectional view indicated by line 4 4 in Fig. 1; Fig. 5, a plan view of a detail of the planter, partly in horizontal section; and Fig. 6, a sectional view indicated by line 6 6 in Fig. 2.

Referring by letter to the drawings, A indicates each of a pair of beams constituting the sides of the frame of my improved potato-planter. Held fast in the frame intermediate of the beams A is the rear end of a draft-tongue B, on which a doubletree-strap $b$ and a yoke $c$ are bolted. In pivotal connection with the yoke is one end of a laterally-projecting inclined arm C, to which a vertically-disposed marker D is adjustably held by a clip $d$ and nuts $e$, these nuts being run on screw-threaded ends of the clip.

The frame-beams A are provided on their under sides with bearings for the axle E of wheels F, and means hereinafter specified are employed for clutching the wheels and axle, said wheels being otherwise loose on said axle. Supported on said beams is an angular yoke G, to which a driver's seat is fastened, and a base H for the machine-tender is made fast on the aforesaid beams back of said yoke.

Engaging a central longitudinal slot in the rear end of the draft-tongue, forward of a bolt $f$, crossing the same, is a handle I in pivotal connection with the forward shank portion of a forked plow or furrow-opener J, the branches of this plow being rearwardly divergent and connected to hangers K, for which bolts $g$, in connection with the frame-beams A, serve as pivots. The handle I is provided with a series of apertures in a vertical direction, and the vertical adjustment of the plow and parts in connection therewith with respect to depth of cut is regulated by means of a pin $h$, extending through one of said apertures to rest upon the draft-tongue. The rear edge of the handle I is provided with notches, the plow and parts in connection therewith being held up out of working position by the engagement of one of said notches with the bolt $f$ aforesaid. The rearwardly-divergent plow branches are connected by a brace $i$, and a vertically-disposed tube L is bolted to this brace. Extending down into the tube L is another tube, M, the upper end of which is vertically recessed at the rear and provided with rearwardly-extending ears $j$, that are made fast to parallel walls N, supported on cross-pieces of the frame to extend at the front into the recess of the tube to which they are connected. Supported in rear upper notches of the walls is a hopper O, to which and the frame-beams A metal straps $k$ are fastened to hold said hopper in place. The feed of potato cuttings from the hopper is controlled by means of a slide-gate P, and the construction of said hopper is such that trays for the material to be planted are provided forward of the gate adjacent to each of the walls N aforesaid.

The walls N are provided with bearings for the journals of a forward sprocket-wheel Q, and journals of a rear sprocket-wheel R engage longitudinal slots in said walls, these slots being shown in Fig. 2. A link-belt potato-conveyer S is trained on the sprocket-wheels to run on a plate T, fastened between the walls N, to therewith form a trough. The journals of the sprocket-wheel R turn in links $m$, that have recurved rear ends. These links straddle bolts extending up through a rear cross-piece of the aforesaid frame, and set-nuts $n$ are run on the bolts to hold said links in adjusted position, the tension of the potato-conveyer being regulated by the adjustment of the aforesaid links.

Fast on a journal of the sprocket-wheel Q is another sprocket-wheel, V, engaging a link belt W, that is also trained on a similar wheel V', in sliding connection with the axle E, against a spiral spring $r$, opposed by a set-collar $s$ on said axle. The tension of the link belt is regulated by a tightener V'' in adjustable connection with one of the frame-beams. The projecting hub of the sprocket-wheel V' is radially notched to form a clutch that engages ends of a pin $t$, fast in the axle E transversely of the same, the engagement being maintained by expansive force of the spring $r$ aforesaid.

A lever X, in spanner connection with the hub of the sprocket-wheel V', has fulcrum support in brackets $u$, extending laterally from one of the frame-beams A, and by manipulation of this lever said sprocket-wheel is thrown out of clutch with the axle E to stop the travel of the potato-conveyer.

The plow-hangers K are provided with outer brackets $y$, in which upturned ends of otherwise horizontal arbors X' are adjustably secured by set-bolts $w$, and the other ends of these arbors are supported by hangers Y, the upper rear ends of which are parallel to the frame-beams A, to which they are adjustably connected to vary the working angle of covering-disks Z, loose on said arbors. As a matter of detail the upper rear end of each hanger Y is provided with a series of apertures longitudinally thereof, any one of these apertures being engaged by a bolt $g$, that also constitutes a plow-hanger pivot. The inner hub-casting of each disk Z has a socket engaged by a boss $y'$ on the corresponding arbor, and thus dirt is kept from working in between said arbor and the disk-hub.

From the foregoing it will be understood that the disks have independent vertical adjustment to regulate depth of cut when in working position, and by varying the angle of said disks provision is had for hilling up more or less earth back of the plow. It will also be understood that the disks are put in and out of working position with the plow.

The hubs of the wheels F are made with ratchet extensions $z$, with which spring-controlled pawls A' are engaged, these pawls being in pivotal connection with brackets B', fast on the axle of said wheels. Hence when the engagement of the pawls and ratchets is effected the axle is caused to turn with the wheels if the planter be moving forward; but there is slip of said wheels on said axle in case of backing of said planter. It also follows if one of the wheels travels forward faster than the other, the slow wheel will slip on the axle when there is an engagement of the pawls and ratchets. As shown in Fig. 6, the arrangement of each spring-controlled pawl A' is such that it can be readily thrown out of engagement with the corresponding ratchet, and there being disengagement of the pawls from the ratchets the wheels F are free to rotate independent of their axles.

The wheel and axle clutch mechanism above specified constitutes the subject-matter of my now pending application, Serial No. 220,172, filed August 10, 1904.

The potatoes or potato cuttings are fed by the conveyer into the tube M and descend through the tube L into the furrow that is opened by the plow, each row being covered and hilled up by the disks. As one row is planted the next row is marked off, and proper dropping of the material to be planted is supervised by an attendant on the machine, said material being put in or taken from the conveyer, as occasion may require.

Having thus described my invention, what I claim as new, and desire to secure by Letters Patent, is—

A potato-planter comprising a vertically-adjustable plow, a vertically-disposed tube in connection with the plow back of its point, a stationary tube extending into the tube aforesaid and having its upper end vertically recessed at the rear, parallel walls engaging the recess and made fast to rearwardly-extending ears of said stationary tube, a plate set in between the walls, an endless conveyer movable between said walls over the interposed plate to discharge into the aforesaid stationary tube, means for starting and stopping the conveyer, a hopper on the aforesaid walls, a gate-controlling feed from the hopper to the conveyer, and covering-disks adjustable with the plow as well as to working angle and depth of cut.

In testimony that I claim the foregoing I have hereunto set my hand, at Milwaukee, in the county of Milwaukee and State of Wisconsin, in the presence of two witnesses.

J. R. STEITZ.

Witnesses:
 N. E. OLIPHANT,
 E. W. HELLER.